United States Patent [19]
Kato et al.

[11] Patent Number: 5,678,099
[45] Date of Patent: Oct. 14, 1997

[54] SMALL SIZE CAMERA ASSEMBLY

[75] Inventors: Mikio Kato, Tokyo; Shigeki Toyama, 2-24-48-303, Nakacho, Koganei-shi, Tokyo, both of Japan

[73] Assignees: Nippon Robotmation Co., Ltd.; Shigeki Toyama, both of Tokyo, Japan

[21] Appl. No.: 634,560

[22] Filed: Apr. 18, 1996

[51] Int. Cl.$^6$ .......................... G03B 29/00; G03B 17/02
[52] U.S. Cl. .......................... 396/427; 396/429; 396/535
[58] Field of Search .......................... 354/75, 76, 81, 354/354; 396/429, 535, 541, 432, 427, 433

[56] References Cited
U.S. PATENT DOCUMENTS 4,920,367  4/1990  Pagano .......................... 354/81

*Primary Examiner*—Safet Metjahic
*Assistant Examiner*—Nicholas J. Tuccillo
*Attorney, Agent, or Firm*—Kanesaka & Takeuchi

[57] ABSTRACT

A small size camera assembly or micro-intelligent eye of the invention is formed of a spherical member operating as a rotor, a camera body embedded in the spherical member, and a driving device attached to the spherical member for rotating the same. The camera body has a front end and is situated on a diametrical line of the spherical member such that the front end is disposed at least on an outer surface of the spherical member. The driving device and the spherical member constitute a spherical supersonic motor, so that the spherical member can be smoothly moved as desired.

6 Claims, 3 Drawing Sheets

SMALL SIZE CAMERA ASSEMBLY

BACKGROUND OF THE INVENTION AND RELATED ART STATEMENT

The present invention relates to a small size camera assembly or a micro-intelligent eye to be used, for example as a security camera, which can freely select at least two views from the camera.

Conventionally, a small size camera for security is fixed on a ceiling or a column for watching or observing one point or view, which is called as a fixed type camera and is used widely. However, since the view to be observed by the camera is fixed, if several views are to be observed, it is required to install several cameras. However, if several cameras are installed, it requires a large installation cost. Therefore, there has been proposed an operation or moving type camera, wherein views or scenes can be freely changed by one camera to provide advantages similar to several cameras.

However, the operation type camera requires a plurality of motors and a complicated transmission mechanism. If the transmission mechanism is deformed or partly loosened, the camera may not be precisely directed to the view or scene. Also, the mechanism thereof is heavy and large. Therefore, the location and method of attaching the operation type camera are limited.

The present invention has been made to obviate the above problems, and an object of the invention is to provide a small size camera assembly or a micro-intelligent eye, which is small and has light weight.

Another object of the invention is to provide a camera assembly as stated above, wherein views or scenes of a camera can be freely selected and precisely controlled.

A further object of the invention is to provide a camera assembly as stated above, wherein the assembly can be easily and economically manufactured.

Further objects and advantages of the invention will be apparent from the following description of the invention.

SUMMARY OF THE INVENTION

In the present invention, the small size camera assembly or micro-intelligent eye of the invention is formed of a spherical member operating as a rotor, a camera body embedded in the spherical member, and a driving device attached to the spherical member for rotating the same. The camera body has a front end and is situated on a diametrical line of the spherical member such that the front end is disposed on an outer surface of the spherical member. The front end of the camera body may be slightly projected or dented from the outer surface of the spherical member. The driving device and the spherical member constitute a spherical supersonic motor.

In the invention, since the spherical supersonic motor is used, the spherical member having the camera body therein can be smoothly and precisely controlled. Also, the driving mechanism can be made compact.

The driving device includes a casing having an opening in which the spherical member is disposed, and four stator means situated in the casing to be equally spaced apart from each other around the opening. The four stator means contact the surface of the spherical member to hold and rotate the spherical member. Thus, when the stator means are actuated properly, the spherical member rotates inside the casing.

Each stator means has an annular shape stator and an annular shape piezoelectric element attached to a side opposite to the spherical member. Two stator means facing with each other form a pair to establish a rotational axis passing through the pair of the stator means, respectively. Therefore, two rotational axes extending perpendicularly to each other are formed by the four stator means.

When high frequency voltage, frequency of which is in a supersonic range, is applied to the piezoelectric elements forming one pair of the stator means, advancing or progressive waves are generated on the annular shape stators. Therefore, the spherical member are rotated around the rotational axis formed by the pair of the stator means.

DETAILED DESCRIPTION OF PREFERRED EMBODIMENTS

With reference to the drawings, a small size camera assembly or a micro-intelligent eye of the present invention is explained.

Figure 1:
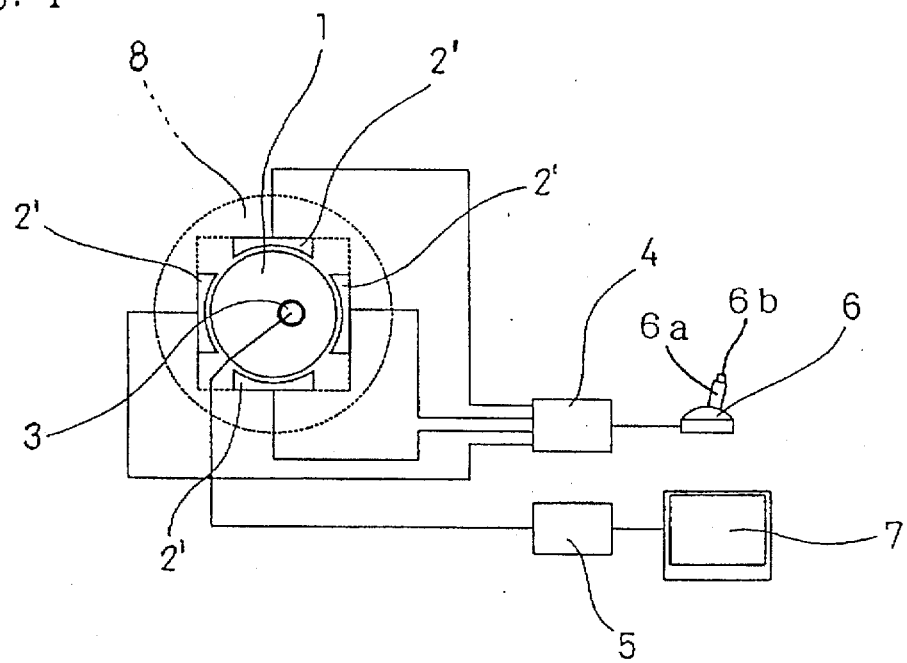
FIG. 1 is a block diagram for forming a small size camera assembly or a micro-intelligent eye of the present invention.

FIG. 1 shows a small size camera assembly or a micro-intelligent eye, which includes a spherical member or rotor 1, four stator means 2', and a small size camera 3 situated in the spherical member 1. The stator means 2' are attached to a motor control unit 4, and the camera 3 is attached to a camera control unit 5. The motor control unit 4 includes a selection or operation device 6 for selecting views or scenes of the camera 3. The camera control unit 5 is connected to a monitor TV 7.

Figure 2:
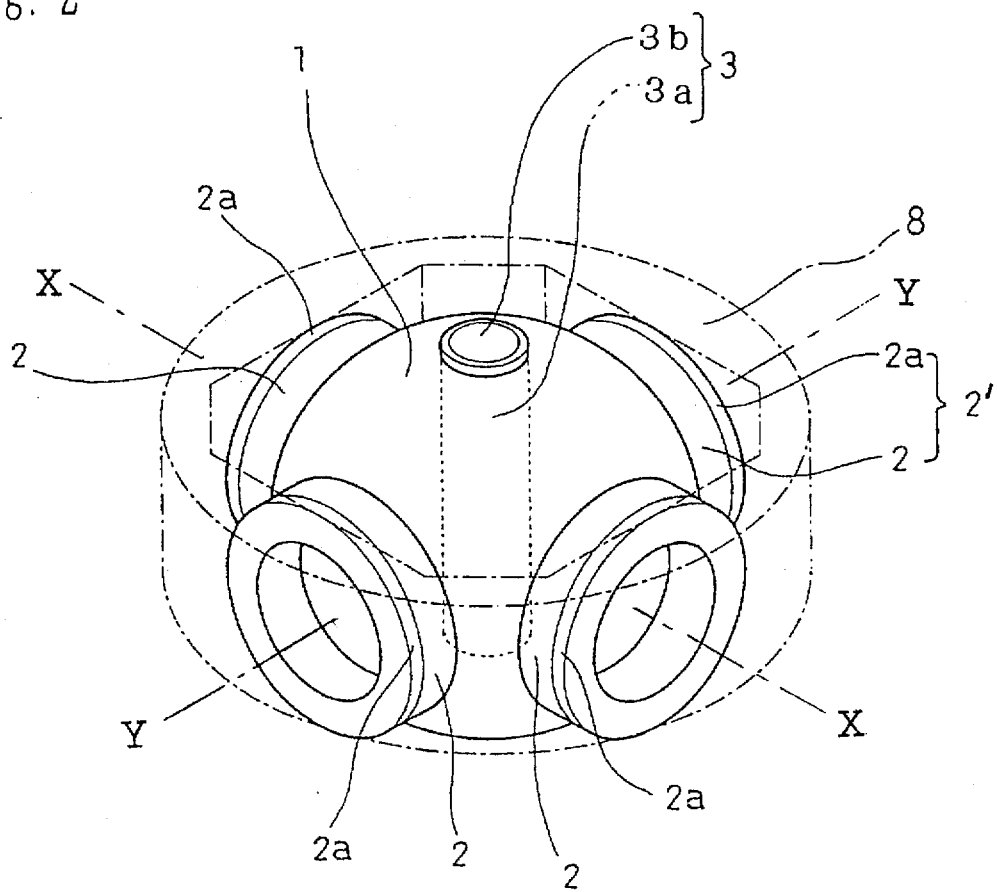
FIG. 2 is a perspective view for showing a driving device.

A driving device is constituted by a spherical supersonic motor. As shown in FIG. 2, the spherical supersonic motor is formed of the spherical member 1 as a rotor, and four stator means 2' a casing 8 holding the stator means 2'. Two stator means 2' facing with each other form a pair to constitute a rotational axis, respectively. Thus, two rotational axes X and Y perpendicularly crossing with each other are formed by the four stator means 2', which pass through the spherical member 1. Each stator means 2' is formed of an annular stator 2 and an annular piezoelectric element 2a fixed to a back surface of the stator 2. The stators 2 are pushed onto the rotor 1 at a predetermined pressure to hold the rotor 1 by the stators 2.

When two phase high frequency voltage in a supersonic range, i.e. over 20 KHz, preferably 30 KHz at 100V, is applied to the piezoelectric element 2a, the piezoelectric element 2a vibrates to form advancing or progressive waves on the annular stator 2. Namely, the progressive waves moving in one direction are formed on the surface of the annular stator 2 contacting the rotor 1. Since the stator has an annular shape, the rotor 1 contacting the stators 2 rotates around the axis thereof.

In case the rotor or spherical member 1 is to be rotated around the axis X or Y, high frequency voltage is applied to the two piezoelectric elements 2a around the axis X or Y. As a result, the stators 2 adjacent to the activated piezoelectric elements 2a form progressive waves on the surface thereof, so that the spherical member 1 rotates around the axis X or Y. The direction of the progressive waves on the annular stator 2 is controlled by the difference of phase of the alternating current with two phases based on time.

Incidentally, the rotor 1 is formed of an engineering plastic, and the stator 2 is formed of brass.

The small camera 3 may be a CCD (Charge Coupled Device). As shown in FIG. 2, the small camera 3 is situated in the rotor 1 such that a body 3a of the camera 3 is located in a central axis of the rotor 1, and a lens 3b at the front end of the camera 3 slightly projects outwardly from the surface of the rotor 1.

The camera 3 and the stator means 2' are respectively connected to the camera control unit 5 and the motor control unit 4. The motor control unit 4 is provided with the operation device for selecting the view or scene of the camera 3.

The camera control unit 5 can set various settings of the camera 3 from an operation panel, such as automatic gain control, white balance, electronic shutter, pedestal level, and horizontal phase and sub-carrier phase at the time of external synchronization. Also, the control unit 5 outputs picture signals through an image terminal for high quality VTR or a composite terminal.

The picture signals can be monitored by the monitor TV 7, or recorded on a tape in a VCR deck (not shown).

The motor control unit 4 controls difference of phase of the alternating current based on time applied to the stator means 2', which corresponds to location data of the operation device 6 explained later. The rotor 1 can be rotated to a desired direction in synchronizing with the movement of the operation device 6, so that the view or scene of the camera 3 embedded in the rotor 1 can be moved to a desired direction of an operator.

The operation device 6 may be a joy-stick and mouse. The operation device 6 outputs to the motor control unit angle data corresponding to an inclination angle and direction of an operation lever 6a and rotation data corresponding to a push button 6b.

The camera assembly or micro-intelligent eye of the invention thus constructed may be used, as explained below.

Figure 3:
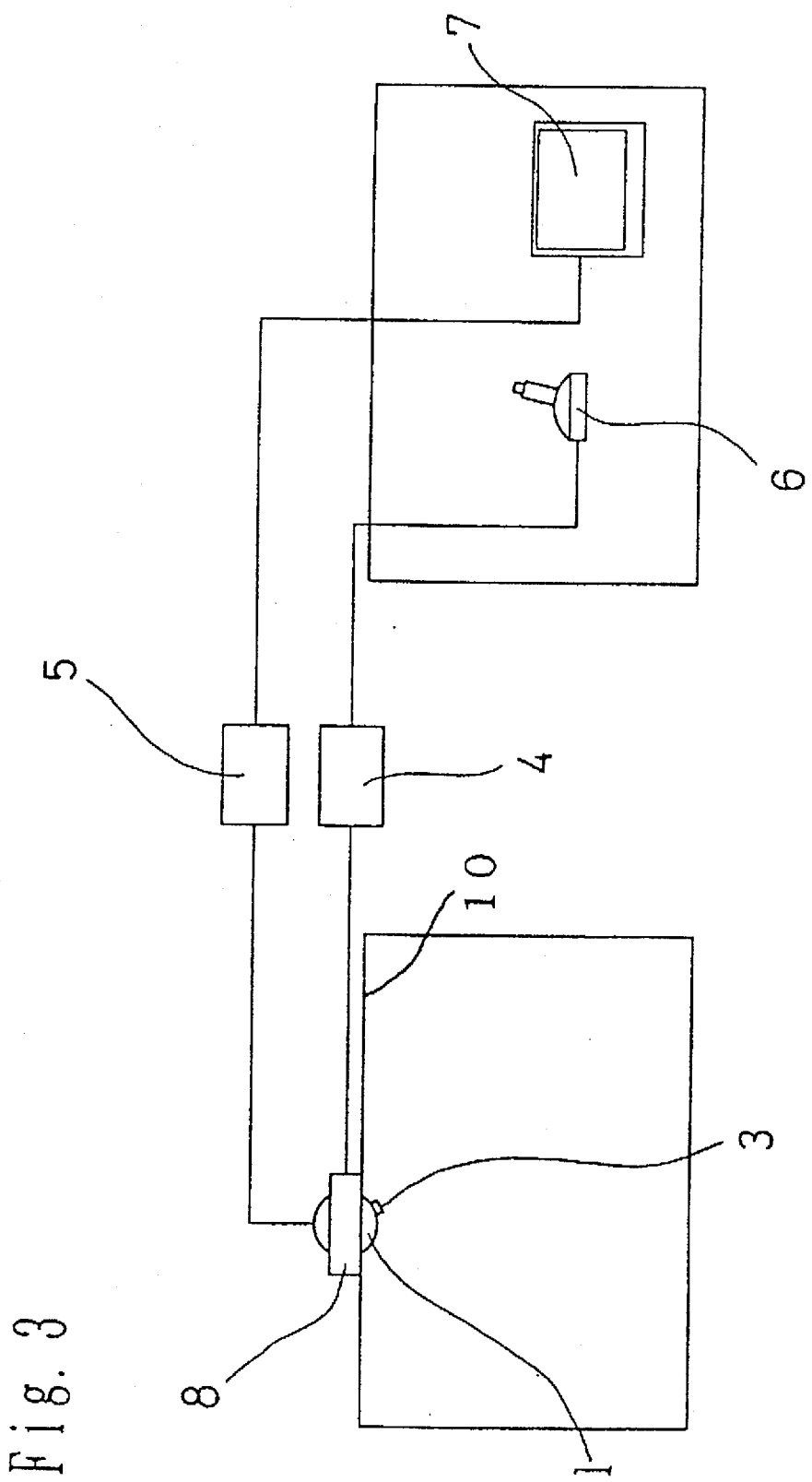
FIG. 3 is an explanation view for showing an example in use of the assembly.

In FIG. 3., the micro-intelligent eye is used for a watching or observation device, wherein the casing 8 is fixed to a ceiling 10 such that a part of the rotor 1 where the lens 3b of the camera 3 is attached projects from the ceiling 10. The monitor TV 7 connected to the camera control unit 5 and the operation device 6 connected to the motor control unit 4 are located in an observation room. An operator can freely move the view or scene of the camera 3 by the operation device 6 while looking the monitor TV 7.

When the operator tilts the operation lever 6a, the angle data and rotation data outputted from the operation device 6 are changed to a moving amount of the rotor 1 at the motor control unit 4, so that alternating current applied to the stators 2 is controlled. Thus, the rotor or spherical member 1 rotates in synchronizing with the movement of the operation lever 6a, and it is possible to move the view of the camera 3 in the rotor 1 to a direction desired by the operator.

In the micro-intelligent eye thus arranged, the area exposed from the ceiling is very small when comparing with the conventional TV camera. Therefore, it is difficult for an invader to realize the observation camera, so that the observation effect can be increased significantly.

Also, the body portion 3a of the camera 3 is embedded in the rotor 1, and the lens 3b only projects from the spherical surface. Therefore, if the view of the camera 3 is changed by rotating the rotor 1, movement of the camera 3 is not easily realized when comparing with the conventional camera. Thus, the effect of observation is further increased.

Figure 4:
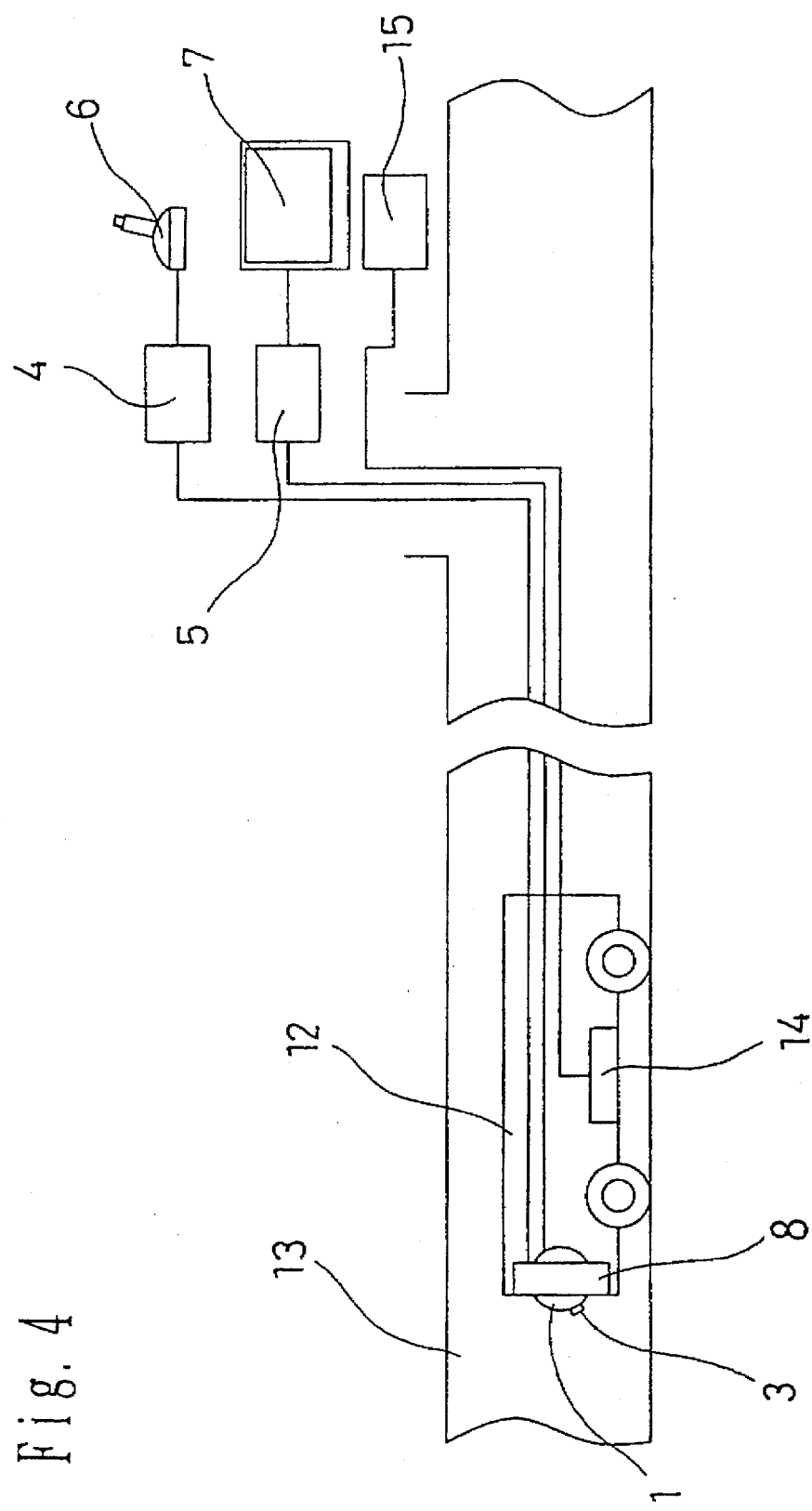
FIG. 4 is an explanation view for showing another example in use of the invention.

In FIG. 4, the micro-intelligent eye is used for an investigation device, wherein the micro-intelligent eye is disposed at a front portion of a moving device 12 controlled by a remote controlling device. For example, the moving device 12 is disposed in a pipe 13, and the monitor TV 7 connected to the cameral control unit 5, the operation device 6 connected to the motor control unit 4 and a control device 15 for remote-controlling a driving device 14 of the moving device 12 are disposed outside the pipe 13. An operator observes the monitor TV 7 while controlling the moving device 12 by the control device 15, wherein the view of the camera 3 is moved as required.

In case the micro-intelligent eye is attached to the moving device 12, since the micro-intelligent eye is small relative to the moving device 12, it is possible to detect or check a narrow portion when comparing with the conventional device. Also, since the view of the camera can be moved, it is possible to see the conditions in the upper, lower, right and left directions as well as the front direction.

Accordingly, it is possible to provide the camera assembly or micro-intelligent eye suitable to the moving device, which can be used for effectively operating in observing or checking the inside of a house or building broken down by, e.g. earth quake.

Further, the fields that the camera assembly or micro-intelligent eye can be used are not limited, and it is possible to use, for example, in a medical field, industrial field, checking pipeline, helping in disaster, nuclear plant, protecting crime, investigation, robot and so on. In the invention, since reduction gears used for a conventional observation camera wherein an electric motor is used as a driving source, are not required, location or direction of the camera can be accurately controlled. Thus, it is possible to accurately measure, for example an inner observing angle by one micro-intelligent eye instead of using two cameras. Thus, it is possible to use the micro-intelligent eye in precise measurement of length.

In the camera assembly or micro-intelligent eye of the invention, the small camera is held in the spherical member, and the spherical member is directly rotated by the supersonic motor. Thus, it is possible to make the micro-intelligent eye compact when comparing with the conventional observation camera. Further, since the reduction gear is not required, the view or scene can be precisely controlled.

While the invention has been explained with reference to the specific embodiment of the invention, the explanation is illustrative and the invention is limited only by the appended claims.

What is claimed is:

1. A small size camera assembly, comprising:
    a spherical member operating as a rotor,
    a camera body embedded in the spherical member, said camera body having a front end and being situated on a diametrical line of the spherical member such that the front end is disposed at least on an outer surface of the spherical member, and
    a driving device attached to the spherical member for rotating the same, said driving device and the spherical member constituting a spherical supersonic motor.

2. A small size camera assembly according to claim 1, wherein said driving device includes a casing having an opening in which the spherical member is disposed, and four stator means situated in the casing around the opening to be equally spaced apart from each other, said stator means contacting a surface of the spherical member to hold and rotate the spherical member.

3. A small size camera assembly according to claim 2, wherein each stator means has an annular shape stator and an annular shape piezoelectric element attached to a side opposite to the spherical member so that when high frequency voltage is applied to the piezoelectric element, progressive waves are formed in the annular shape stator to thereby rotate the spherical member around a center of the annular shape stator.

4. A small size camera assembly according to claim 3, wherein two stator means facing with each other form a pair, respectively, each line established by connecting said each pair forming a rotational axis of the spherical member to rotate the spherical member therearound.

5. A small size camera assembly according to claim 4, further comprising a motor control unit attached to the stators, said motor control unit providing said high frequency voltage to the piezoelectric elements to control rotation of the spherical member, and a control bar attached to the motor control unit for actuating the spherical member.

6. A small size camera assembly according to claim 5, further comprising a camera control unit attached to the camera body for adjusting mechanisms in the camera body and obtaining images through the camera body.

* * * * *